US012792047B2

(12) United States Patent
Wang

(10) Patent No.: US 12,792,047 B2
(45) Date of Patent: Nov. 10, 2026

(54) SYSTEMS AND METHODS FOR SIMULTANEOUS LOCALIZATION AND MAPPING IN UNDERGROUND ENVIRONMENTS

(71) Applicant: ApoSys Technologies Inc., Mississauga (CA)

(72) Inventor: Zhongshuai Wang, Mississauga (CA)

(73) Assignee: ApoSys Technologies Inc., Mississauga (CA)

(*) Notice: Subject to any disclaimer, the term of this patent is extended or adjusted under 35 U.S.C. 154(b) by 0 days.

(21) Appl. No.: 18/936,637

(22) Filed: Nov. 4, 2024

(65) Prior Publication Data

US 2025/0284282 A1 Sep. 11, 2025

Related U.S. Application Data

(60) Provisional application No. 63/563,738, filed on Mar. 11, 2024.

(51) Int. Cl.
*G05D 1/246* (2024.01)

(52) U.S. Cl.
CPC .................................... *G05D 1/246* (2024.01)

(58) Field of Classification Search
CPC ................ G05D 1/246; G01C 21/1652; G01C 21/3848; G01C 21/3841; G01S 7/4808; G01S 7/51; G01S 17/86; G01S 17/89
See application file for complete search history.

(56) References Cited

U.S. PATENT DOCUMENTS

| | | | | |
|---|---|---|---|---|
| 2020/0309541 | A1* | 10/2020 | Lavy | G06V 20/588 |
| 2022/0236073 | A1 | 7/2022 | Homann et al. | |
| 2022/0252691 | A1 | 8/2022 | Vaskevicius et al. | |

(Continued)

FOREIGN PATENT DOCUMENTS

| | | | |
|---|---|---|---|
| CN | 115290073 | A | 11/2022 |
| CN | 16412810 | A | 7/2023 |

(Continued)

OTHER PUBLICATIONS

Zlot Robert et al., Efficient Large-scale Three-dimensional Mobile Mapping for Underground Mines, Journal of Field Robotics, vol. 31, No. 5, Sep. 2014, XP093131038 (22 pages).

(Continued)

*Primary Examiner* — Alan D Hutchinson
(74) *Attorney, Agent, or Firm* — SMART & BIGGAR LP; Stephen Beney; Sunil R. Rao

(57) ABSTRACT

Systems and computer-implemented methods of simultaneous localization and mapping in underground environments are provided. The method comprises: generating mapping data of the underground environment and inertial measurement data of an agent traversing the underground environment; generating, by the agent, reduced mapping data by performing data reduction of the generated mapping data; updating, by the agent, a local map based on correlated features in the reduced mapping data; updating, by the agent, a localized position of the agent with reference to the updated local map; and providing, by the agent via a user interface, a localization and mapping output including at least one of the updated local map and the updated localized position of the agent.

14 Claims, 8 Drawing Sheets

(56) References Cited

U.S. PATENT DOCUMENTS

| | | | | |
|---|---|---|---|---|
| 2023/0175860 | A1 | 6/2023 | Catt | |
| 2023/0357076 | A1* | 11/2023 | Kroepfl | G01C 21/3841 |

FOREIGN PATENT DOCUMENTS

| | | | |
|---|---|---|---|
| WO | 2021159211 | A1 | 8/2021 |
| WO | 2023036994 | A1 | 3/2023 |

OTHER PUBLICATIONS

Ali Agha et al., NeBula: Quest for Robotic Autonomy in Challenging Enviornments; TEAM CoSTAR at the DARPA Subterranean Challenge, Cornell University Library, Oct. 2021, XP091065883 (77 pages).

* cited by examiner

SYSTEMS AND METHODS FOR SIMULTANEOUS LOCALIZATION AND MAPPING IN UNDERGROUND ENVIRONMENTS

CROSS-REFERENCE TO RELATED APPLICATION

This application claims the benefit of U.S. Provisional Patent Application No. 63/563,738 filed Mar. 11, 2024, and the entire contents of U.S. Provisional Patent Application No. 63/563,738 are hereby incorporated herein in its entirety.

FIELD

The described embodiments relate to systems and methods for simultaneous localization and mapping, and specifically to systems and methods for simultaneous localization and mapping in underground environments.

BACKGROUND

Global Navigation Satellite Systems (GNSS) (e.g., Global Positioning System (GPS)) enables satellite-based positioning and navigation systems for many applications. GNSS technology is used, for example, in global shipping, air traffic control, various industrial applications, personal use (e.g., smartphone or other handheld consumer electronics-based applications), military etc. The prevalence of readily available GPS and other GNSS-related technologies has, however, stunted widespread commercial development of high-fidelity positioning and navigation technologies for environments in which line-of-sight satellite communications may not be available. The lack of complementary technologies to GNSS can be an obstacle to growth of industries/applications that require alternatives to GNSS technology. Such industries/applications can include, for example, mining and tunneling applications where positioning knowledge may be critical for worker safety but where positioning and navigation using GNSS is impractical.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

In a first aspect, there is provided a computer-implemented method of simultaneous localization and mapping in underground environments. The method comprises: generating mapping data of the underground environment and inertial measurement data of an agent traversing the underground environment; generating, by the agent, reduced mapping data by performing data reduction of the generated mapping data; updating, by the agent, a local map based on correlated features in the reduced mapping data; updating, by the agent, a localized position of the agent with reference to the updated local map; and providing, by the agent via a user interface, a localization and mapping output including at least one of the updated local map and the updated localized position of the agent.

In one or more embodiments, the mapping data includes any combination of range data, bearing data and elevation data of the underground environment with reference to the agent.

In one or more embodiments, the mapping data includes at least one of i) image data generated by one or more cameras and ii) point cloud data generated by one or more Light Detection and Ranging (LiDAR) sensors.

In one or more embodiments, the inertial measurement data includes linear acceleration and angular velocity of the agent along three mutually perpendicular axes.

In one or more embodiments, the reduced mapping data is generated by inputting the mapping data into one or more machine learning models trained to project the mapping data to a lower dimensional latent space.

In one or more embodiments, the one or more machine learning models are trained using training data customized for underground mining environments.

In one or more embodiments, the localization and mapping output further includes an insight or recommendation for improving the simultaneous localization and mapping.

In a second aspect, there is provided a system for simultaneous localization and mapping in underground environments. The system comprises an agent configured to traverse the underground environment. The agent has an inertial sensor configured to generate inertial measurement data of the agent; a mapping sensor configured to generate mapping data of the underground environment; a memory storing processor-executable instructions; and a processor communicatively coupled to the memory. The instructions configure the processor to: receive the inertial measurement data and the mapping data; generate reduced mapping data by performing data reduction of the received mapping data; update a local map based on correlated features in the reduced mapping data; update a localized position of the agent with reference to the updated local map; and provide, via a user interface, a localization and mapping output including at least one of the updated local map and the updated localized position of the agent.

In one or more embodiments, at least one of the inertial sensor and the mapping sensor includes multiple sensors collocated on a single substrate.

In one or more embodiments, the processor is collocated on a same substrate as at least one of the inertial sensor and the mapping sensor.

In one or more embodiments, the mapping sensor includes one or more cameras, and the mapping data includes image data generated by the one or more cameras.

In one or more embodiments, the mapping sensor includes one or more Light Detection and Ranging (LiDAR) sensors and the mapping data includes point cloud data generated by the one or more LiDAR sensors.

In one or more embodiments, the inertial measurement data includes linear acceleration and angular velocity of the agent along three mutually perpendicular axes.

In one or more embodiments, the processor is configured to generate the reduced mapping data by inputting the mapping data into one or more machine learning models trained to project the mapping data to a lower dimensional latent space.

In one or more embodiments, the one or more machine learning models are trained using training data customized for underground mining environments.

In one or more embodiments, the localization and mapping output further includes an insight or recommendation for improving the simultaneous localization and mapping.

In a third aspect, there is provided a computer-implemented method of simultaneous localization and mapping in underground environments. The method comprises: receiving, by a central server, reduced mapping data and localized position data from each of multiple agents traversing the underground environment; updating, by the central server, a global map by combining the reduced mapping data from the multiple agents and performing cross-correlation across the multiple agents; updating, by the central server, global positioning of each of the multiple agents based on the received localized position data and the updated global map; providing, by the central server, the updated global map and the updated global positioning to each of the multiple agents; and providing, by the central server via a user interface, a localization and mapping output including at least one of the updated global map and the updated global positioning of one or more of the multiple agents.

In one or more embodiments, the central server is implemented by dynamically assigning central server functionalities dynamically between the multiple agents.

In one or more embodiments, the method further comprises updating a mapping confidence level associated with a region of the underground environment based on a time duration since previous scan of the region.

In a fourth aspect, there is provided a system for simultaneous localization and mapping in underground environments. The system comprises multiple agents configured to traverse the underground environment and a central server. Each of the multiple agents has an inertial sensor configured to generate inertial measurement data of the agent and a mapping sensor configured to generate mapping data of the underground environment, each of the multiple agents being configured to generate reduced mapping data and localized position data for that agent based on the mapping data and the inertial measurement data of that agent. The central server has a memory storing processor-executable instructions and a processor communicatively coupled to the memory. The instructions configure the processor to: receive the reduced mapping data and localized position data from each of the multiple agents; update a global map by combining the reduced mapping data from the multiple agents and performing cross-correlation across the multiple agents; update global positioning of each of the multiple agents based on the received localized position data and the updated global map; provide the updated global map and the updated global positioning to each of the multiple agents; and provide, via a user interface, a localization and mapping output including at least one of the updated global map and the updated global positioning of one or more of the multiple agents.

BRIEF DESCRIPTION OF THE DRAWINGS

The drawings included herewith are for illustrating various examples of systems, methods, and devices of the teaching of the present specification and are not intended to limit the scope of what is taught in any way.

DETAILED DESCRIPTION

Figure 1:
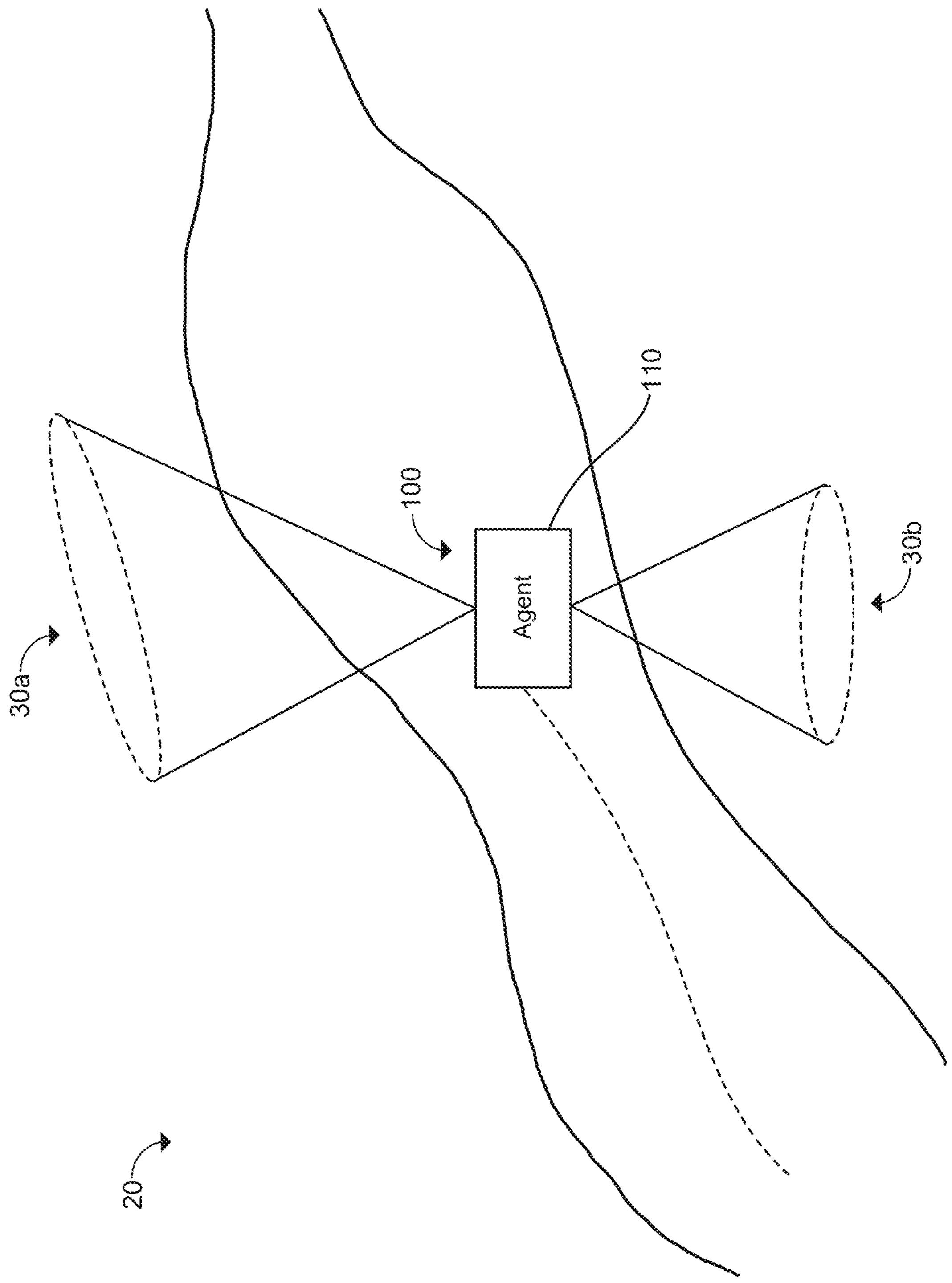
FIG. 1 is a schematic diagram showing a system for simultaneous localization and mapping, in accordance with one or more embodiments.

Several example embodiments are described herein. It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, personal computer, laptop, personal data assistant, cellular telephone, smart-phone device, tablet computer, wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high-level procedural or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modifications and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

The disclosed systems and methods can enable simultaneous mapping and localization in underground environments in which line-of-sight satellite-based communication may not be available. For example, the disclosed systems and methods may be used in mining and tunneling applications. The disclosed system and methods can enable the shift of mining and tunneling towards electrification to improve reliability, efficiency, and workplace safety. The disclosed system and methods can provide real-time, dynamic, and collaborative mapping and positioning for vehicles, personnel, and assets while informing users about changing conditions and environmental hazards on site. The disclosed system and methods can provide a robust underground positioning system to enable a transition towards fully autonomous mines.

In some applications, the disclosed systems and methods may be used to complement GNSS technology to provide improvement in accuracy, precision, and/or reliability. For example, the localization and mapping data generated using the disclosed systems and methods may be used to complement GNSS data in critical infrastructure and military applications. GNSS technology (e.g., GPS) may lack systematic redundancy required in critical infrastructure and military applications. The disclosed systems and methods can provide redundancy in such applications.

The disclosed systems and methods can serve as a robust replacement for geo-positioning systems for applications that are unable to tolerate single-point systematic failure. The disclosed systems and methods can provide a completely independent means for high-precision positioning for civilian and military applications in which systems like GPS may be intermittently or actively blocked.

In some applications, the disclosed systems and methods may be used in combination with other alternatives to GNSS-based navigation technologies, for example, Celestial-Aided Navigation, Magnetic Anomaly-Aided Navigation, and Vision-Aided Navigation. The disclosed systems and methods can provide reliable reference points to calibrate and utilize these alternative technologies with greater precision and accuracy.

Reference is first made to FIG. 1. FIG. 1 is a schematic diagram showing an example system 100 for simultaneous localization and mapping in an environment 20. Environment 20 can be an underground environment (e.g., a mine or a tunnel) where line-of-sight satellite communication may not be available for mapping and positioning using GNSS technology.

System 100 includes an agent 110. Agent 110 can be any suitable device that traverses and provides sensor data for environment 20. For example, agent 110 may include a mobile user device or a device mounted on a vehicle (e.g., a mining vehicle, an unmanned aerial vehicle etc.). In the illustrated example, agent 110 traverses along path 120 and captures sensor data for various portions 30 (e.g., portions 30*a* and 30*b*) of environment 20.

In some embodiments, agent 110 may traverse along all three dimensions of a three-dimensional environment 20. In other embodiments, agent 110 may only traverse along one or two dimensions of a three-dimensional environment 20.

Figure 2:
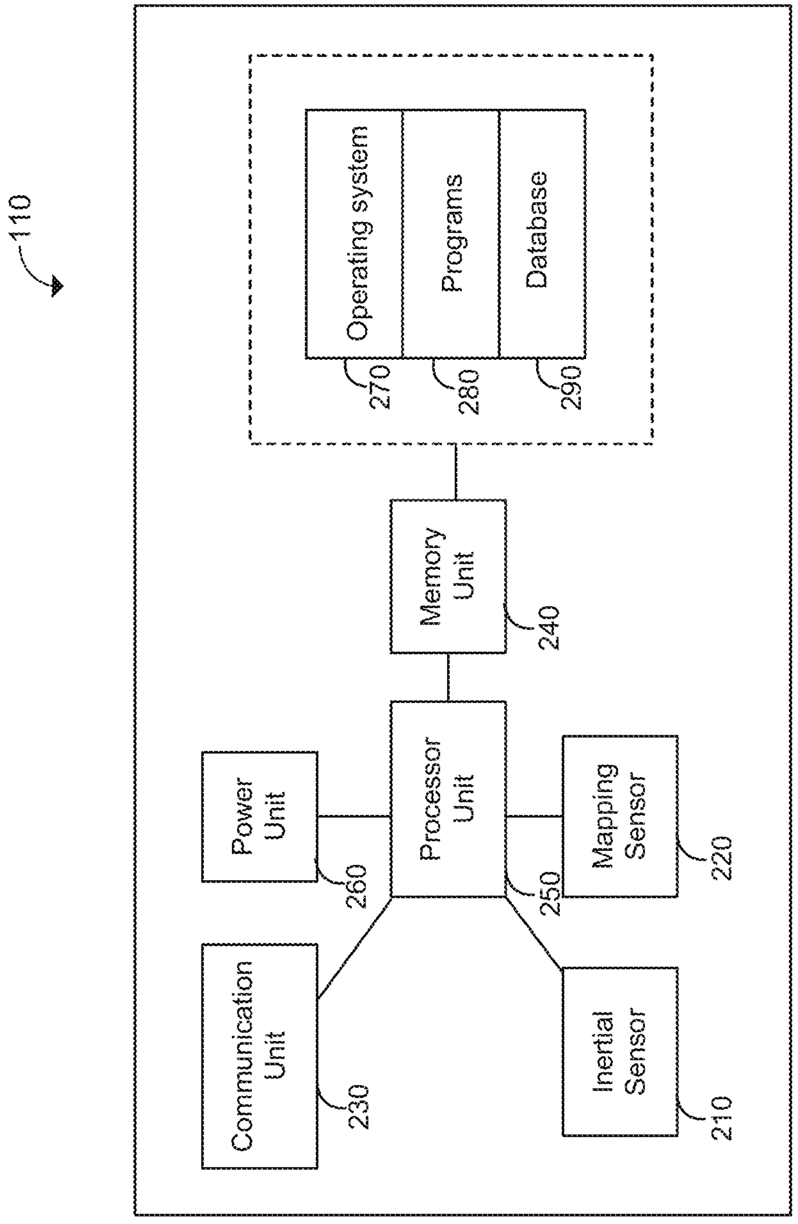
FIG. 2 is a block diagram showing components of an example agent of the system of FIG. 1.

Reference is now made to FIGS. 1 and 2. FIG. 2 is a block diagram showing components of agent 110. In the illustrated example, agent 110 includes an inertial sensor 210, a mapping sensor 220, a communication unit 230, a memory unit 240, a processor unit 250, and a power unit 260. In other examples, agent 110 may include fewer or greater number of components. For example, agent 110 may include multiple inertial sensors 210 and/or multiple mapping sensors 220.

Inertial sensor 210 may include any suitable combination of number and types of sensors configured to generate inertial measurement data for agent 110. For example, inertial sensor 210 may include one or more sensors configured to generate inertial measurement data that includes linear acceleration and angular velocity of agent 110 along three mutually perpendicular axes. In some embodiments, inertial sensor 210 may include multiple sensors collocated on a single substrate. Multiple sensors collocated on a single substrate may enable a more compact design of agent 110. In other embodiments, inertial sensor 210 may include multiple sensors located on different substrates. In some examples, the relative location of each of the multiple sensors with respect to the other sensors of inertial sensor 210 may be fixed. In other examples, the relative location of at least one of the multiple sensors with respect to the other sensors of inertial sensor 210 may vary with time. Multiple sensors collocated on different substrates may provide greater modularity and/or design flexibility.

Mapping sensor 220 may include any suitable combination of number and types of sensors configured to generate mapping data of environment 20. The mapping data may include, for example, range, bearing and/or elevation data of environment 20 with reference to agent 110. In some embodiments, mapping sensor 220 may include one or more cameras configured to generate image data of environment 20. The image data may include monochromatic image data. Optionally, the image data may include multiple datasets of monochromatic image data where the multiple datasets correspond to different wavelengths. In some embodiments, mapping sensor 220 may include one or more Light Detection and Ranging (LiDAR) sensors configured to generate point cloud data of environment 20 with reference to agent 110. The point cloud data may include three-dimensional point cloud data.

In some embodiments, mapping sensor 220 may include multiple sensors collocated on a single substrate. Optionally, mapping sensor 220 and inertial sensor 210 may be located on the same substrate. Multiple sensors collocated on a single substrate may enable a more compact design of agent 110. In other embodiments, mapping sensor 220 may include multiple sensors located on different substrates. In some examples, the relative location of each of the multiple sensors with reference to the other sensors of mapping sensor 220 may be fixed. In other examples, the relative location of at least one of the multiple sensors with reference to the other sensors of mapping sensor 220 may vary with time. Multiple sensors collocated on different substrates may provide greater modularity and/or design flexibility. In some embodiments, a single sensor may provide combined functionalities of inertial sensor 210 and mapping sensor 220.

Communication unit 230 may include any suitable design to provide bidirectional communication for agent 110 with other devices or computers. Communication unit 230 may include wired or wireless connection capabilities. Communication unit 230 may enable the bidirectional communication using any suitable communication network. The communication network may include, for example, the Internet, a Wide-Area Network (WAN), a Local-Area Network (LAN), a point-to-point connection, etc. The communication may be implemented using time-stamped communication messages. In some embodiments, communication unit 230 may enable low-latency communication for agent 110.

Power unit 260 may have any suitable design to provide power to other components of agent 110. For example, power unit 260 may include a battery pack.

Processor unit 250 may have any suitable design to perform operations of agent 110. Processor unit 250 can be any suitable processor, controller or digital signal processor that can provide sufficient processing power depending on the configuration, purposes and requirements of agent 110, as is known by those skilled in the art. For example, processor unit 250 may be a high-performance general processor. As another example, processor unit 250 may include a standard processor, such as an Intel® processor, or an AMD® processor. As another example, processor unit 250 can include more than one processor with each processor being configured to perform different dedicated tasks. As another example, specialized hardware (e.g., graphical processing units (GPUs)) can be used provide some of the functions provided by processor unit 250.

Processor unit 250 may control the operation of other components of agent 110. In some embodiments, processor unit 250 may determine position, motion and/or orientation of agent 110 with reference to a local map for one or more time periods. Processor unit 250 may determine the position, motion and/or orientation based on inertial measurement data generated by inertial sensor 210 and/or mapping data generated by mapping sensor 220.

In some embodiments, processor unit 250 may be collocated on the same substrate as inertial sensor 210 and/or mapping sensor 220. This may enable greater communication efficiency between processor unit 250 and the sensor(s). In some embodiments, processor unit 250 may be at a remote location and communicate with agent 110 using a communication network. This may enable a more compact design for agent 110.

Memory unit 240 can include software code for implementing an operating system 270, programs 280 and a database 290. Memory unit 240 can include RAM, ROM, one or more hard drives, one or more flash drives or some other suitable data storage elements such as disk drives, etc. In some embodiments, memory unit 240 may be at a remote location and communicate with agent 110 using a communication network. This may enable a more compact design for agent 110. In some embodiments, memory unit 240 may be integrated into processor unit 250. This may enable faster memory read/write operations for processor unit 250.

Memory unit 240 can be used to store an operating system 270 and programs 280, as is commonly known by those skilled in the art. For instance, operating system 270 provides various basic operational processes for agent 110. For example, the operating system 270 may be an operating system such as Windows® Server operating system, or Red Hat® Enterprise Linux (RHEL) operating system, or another operating system. Programs 280 can include various programs so that agent 110 can perform various functions such as, but not limited to, receiving sensor data, performing simultaneous localization and mapping, etc.

Database 290 may include a Structured Query Language (SQL) database such as PostgreSQL or MySQL or a not only SQL (NoSQL) database such as MongoDB, or Graph Databases, etc. Database 290 may store inertial measurement data received from inertial sensor 210 and/or mapping data received from mapping sensor 220. In some embodiments, database 290 may store position, motion and/or orientation data of agent 110 for one or more time periods. Database 290 may store one or more maps of environment 20. For example, the map may be an initial map received from an external device. As another example, database 290 may store multiple time-stamped maps of environment 20 generated by processor unit 250. In some embodiments, database 290 may store one or more machine learning models used by agent 110. For example, agent 110 may use the machine learning models to perform data reduction of point cloud data of environment 20.

Figure 3:
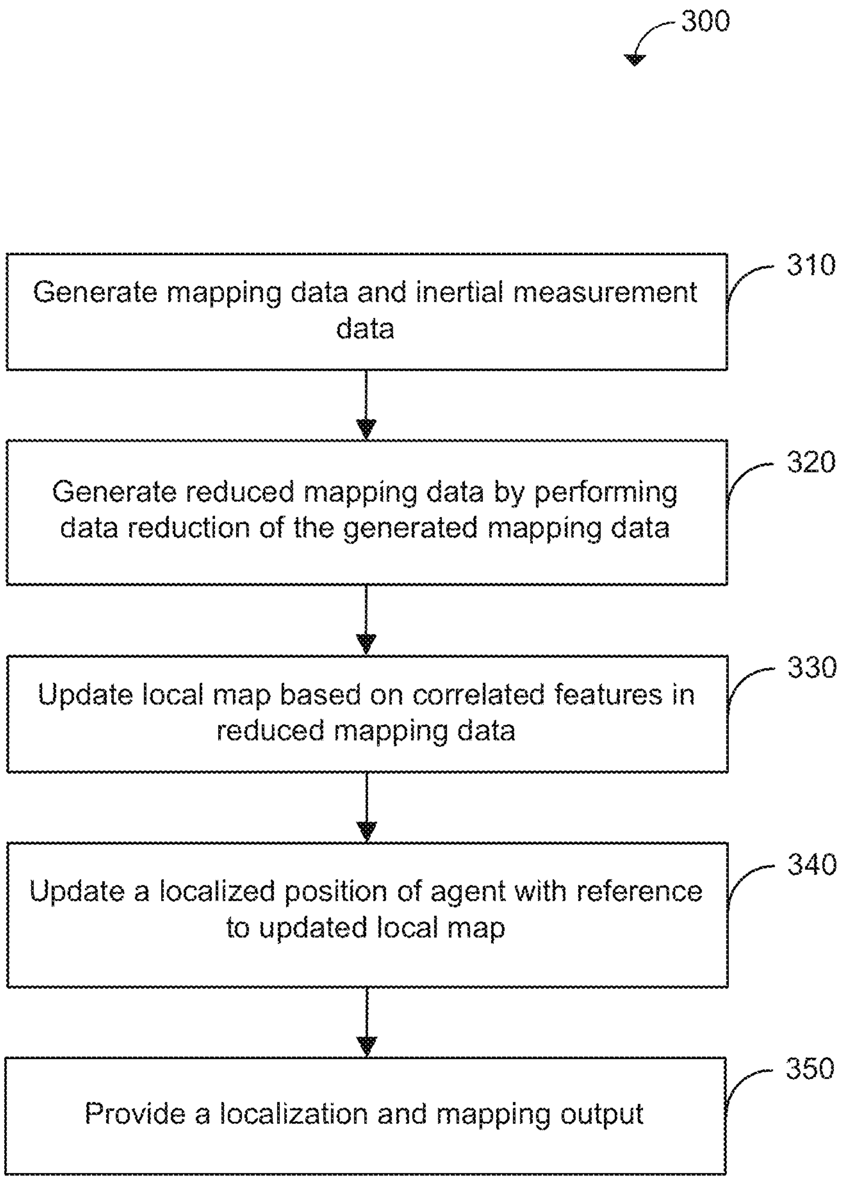
FIG. 3 is a flowchart showing a computer-implemented method of simultaneous localization and mapping, in accordance with one or more embodiments.

Reference is now made to FIG. 3. FIG. 3 is a flowchart showing a computer-implemented method 300 of simultaneous localization and mapping. Any suitable system may be used to implement method 300. For example, method 300 may be implemented using system 100 (FIG. 1) for simultaneous localization and mapping in environment 20 (FIG. 1) and concurrent reference is made now to FIGS. 1 to 3.

Method 300 may be performed at various times. For example, method 300 may be performed based on an automated schedule (e.g. a fixed time interval, a maximum period after previous mapping, etc.). As another example, method 300 may be continuously performed. As another example, method 300 may be automatically performed when a control input is provided (e.g., by a system user) to system 100.

At act 310, method 300 includes generating mapping data and inertial measurement data. For example, inertial sensor 210 can generate inertial measurement data that includes linear acceleration and angular velocity values of agent 110 along three mutually perpendicular axes. As another example, mapping sensor 220 can generate mapping data including, for example, range, bearing and/or elevation data of environment 20 with reference to agent 110. The mapping data may include image data and/or point cloud data.

At act 320, method 300 includes generating reduced mapping data by performing data reduction of the mapping data generated at act 310. For example, processor unit 250 may generate reduced mapping data at act 320 by performing data reduction of the generated mapping data.

Figure 4:
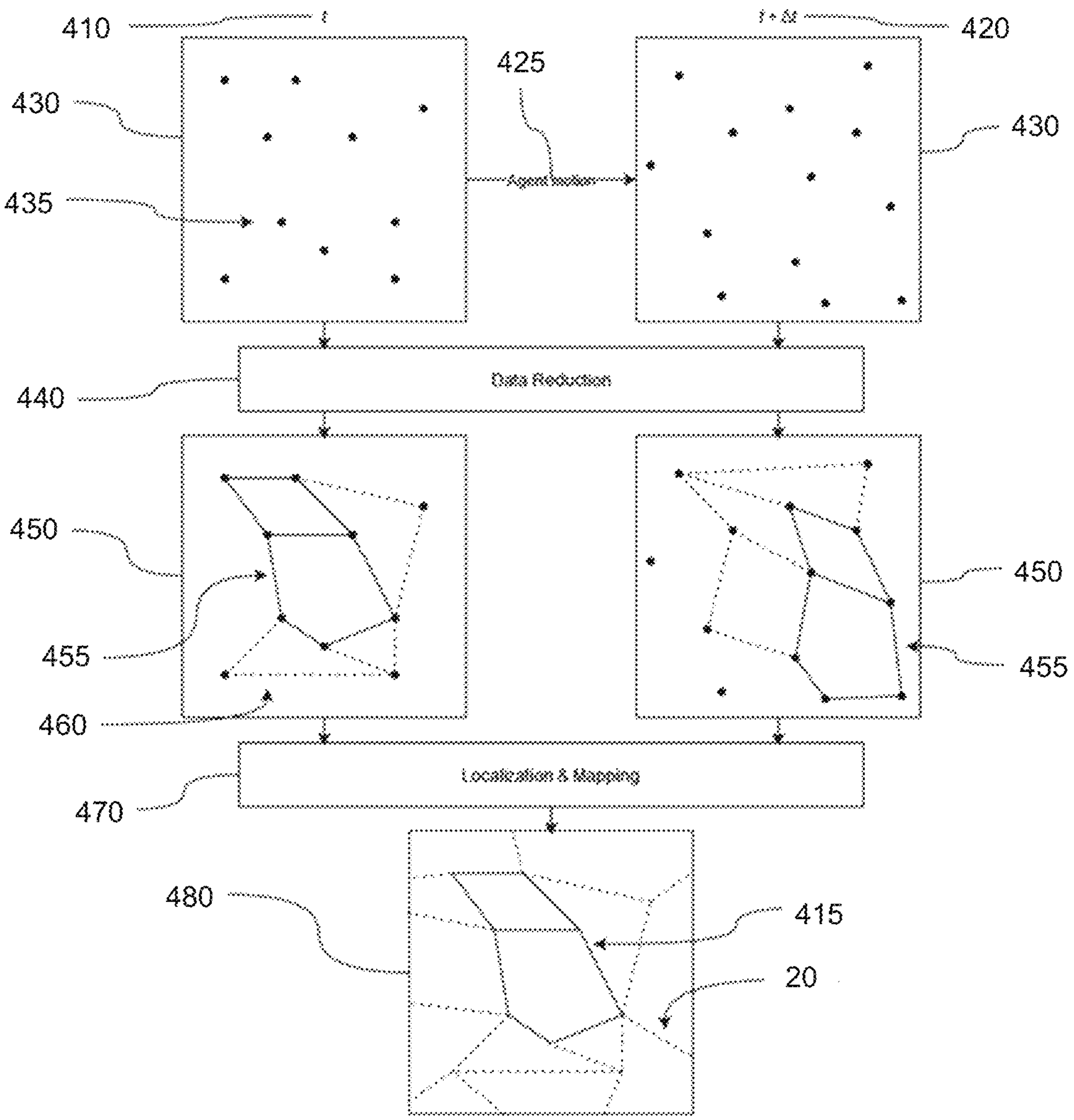
FIG. 4 is a schematic representation of an example data reduction of mapping data performing during the method of FIG. 3.

Reference is now additionally made to FIG. 4 showing a schematic representation of an example data reduction of mapping data. FIG. 4 shows point cloud data 435 in raw data space 430 captured by an agent at a first capture time 410 and a subsequent second capture time 420 following agent motion 425. FIG. 4 illustrates an example that includes point cloud data. In other examples, the capture data may be image data and/or point cloud data. FIG. 4 illustrates difficulties associated (e.g., required computational complexity) with correlation of the captured data for the two capture times 410 and 420. As the number of data points per capture time included in the point cloud data 435 increases (e.g., on the order of millions of data points), the required computational resources for analysis can be impracticably high.

Method 300 can enable reduction in computational resources required for correlation of the captured data by generating the reduced mapping data. Processor unit 250 can use one or more trained machine learning models to project raw captured mapping data to a lower dimensional latent space 450. FIG. 4 illustrates a simplified example of the data reduction to recognizable geometric shapes 455. In other examples, the parameterized space 450 may be specifically tailored to fully leverage the scale and abstract topology that best describes environment 20. For example, the machine learning models may be trained using application-specific training data (e.g., specific training data for undergrounding mining environments).

At act 330, method 300 includes updating a local map based on correlated or matched features in the reduced mapping data. The local map may be a local map that was previously updated using method 300. In some embodiments, system 100 may receive an initial local map from an external device. The reduced mapping data can enable identification of matched features 455 between the first capture time 410 and the second capture time 420 with reduced computation resources. The matched features 455 and/or the unmatched features 460 can provide mapping information of the environment. The mapping information can be used to update a local map 480 of the environment 20.

At act 340, method 300 includes updating a localized position of agent 110 with reference to the updated local map. The localized position may be a localized position that was previously updated using method 300. If no previously updated localized position exists, an initial localized position may be generated at act 340. Processor unit 250 may update the localized position by determining a position, motion and/or orientation of agent 110 over a time period based on the inertial measurement data and the reduced mapping data. Processor unit 250 can determine motion of agent 110 during the time period between first capture time 410 and second capture time 420 based on the identified matched features 155. In some embodiments, processor unit 250 may determine three-dimensional position, speed and/or acceleration of agent 110 with reference to the updated local map for a time period. In some embodiments, processor unit 250 may determine three-dimensional orientation of agent 110 with reference to the updated local map for a time period. For example, processor unit 250 may determine yaw, pitch and roll rate of agent 110 over a time period.

At act 350, method 300 includes providing a localization and mapping output. The localization and mapping output may be provided via a user interface. In some embodiments, the localization and mapping output may be provided via an output file or may be stored in a database (e.g., database 290).

The localization and mapping output may include the updated local map of environment 20 and/or localized position information of agent 110 in near-real-time for user access and/or for higher-level data processing. In some embodiments, the localization and mapping output may include insights and/or recommendations (e.g., insights related to localization and mapping performance of agent 110, metadata related to early warning events, recommendations to improve map accuracy including, for example, agent positioning to map a low confidence region, etc.). One or more machine learning models may be used to generate the insights and/or recommendations.

Figure 5:
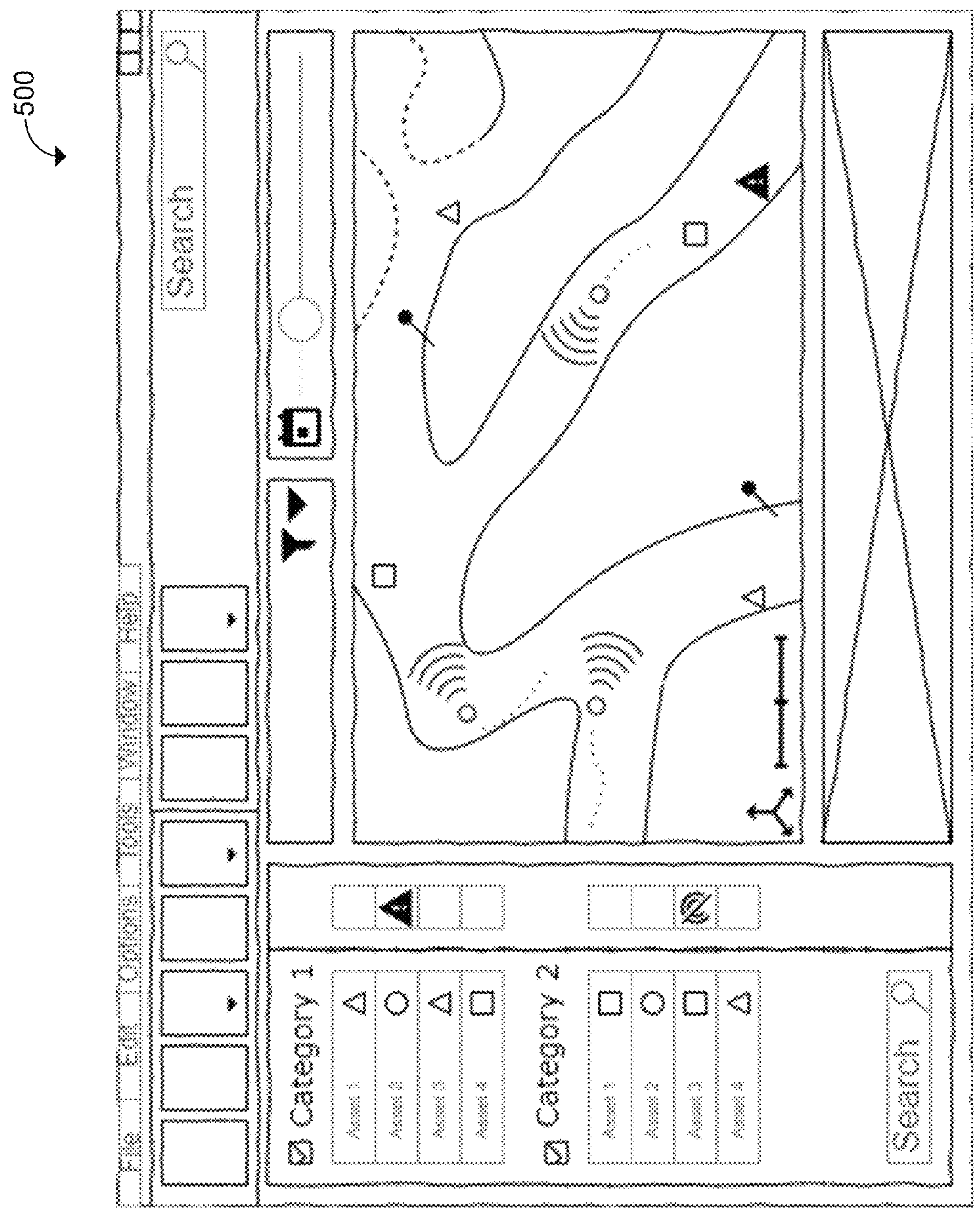
FIG. 5 is a schematic representation of an example GUI for providing a localization and mapping output of the method of FIG. 3.

Reference is now additionally made to FIG. 5. FIG. 5 shows an example GUI 500 for providing a localization and mapping output of an underground environment 20 to a user. GUI 500 may include multiple GUI elements including, for example, a pane, 3D graphics display, a console and/or a menu bar. The relative positioning of the GUI elements may be reconfigurable by a user. GUI 500 can enable a user to visualize and/or interact with agent 110 and/or assets (e.g., personnel, equipment, etc.) in underground environment 20. GUI 500 can display continuously updated positioning for agent 110 in underground environment 20 and/or enable continuous tracking of assets within underground environment 20.

Figure 6:
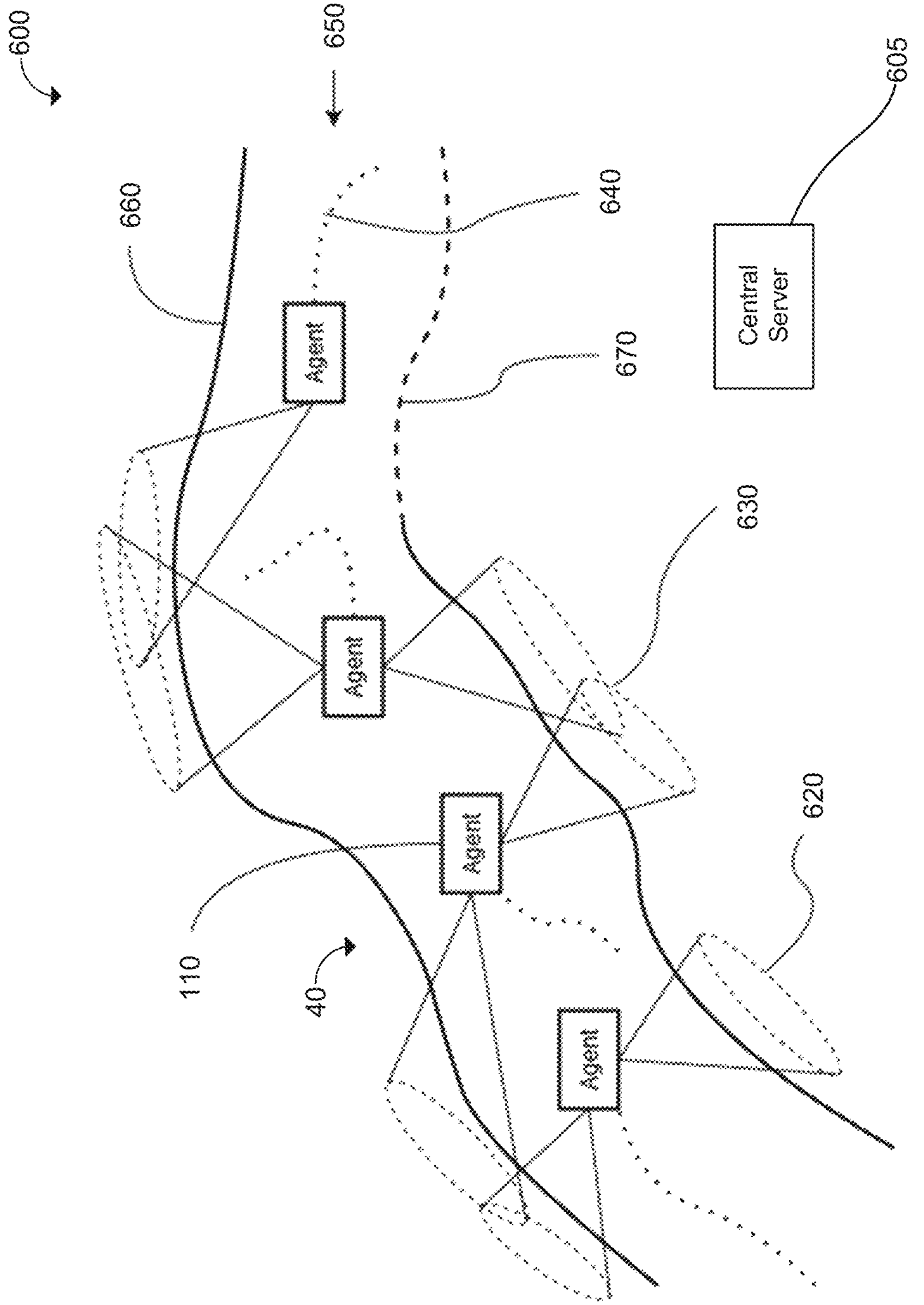
FIG. 6 is a schematic diagram showing another system for simultaneous localization and mapping, in accordance with one or more embodiments.

Reference is now made to FIG. 6. FIG. 6 is a schematic diagram showing an example system 600 for simultaneous localization and mapping in an environment 40. In the illustrated example, system 600 includes multiple agents 110 and a central server 605. In other examples, system 600 may not include a dedicated central server. An agent 110 of the multiple agents 110 may provide the functionalities of the central server. Optionally, the central server functionalities may be dynamically assigned between different agents 110. This may enable higher efficiency utilization of available computational resources at agents 110. In some embodiments, central server 605 may be implemented as multiple servers using distributed computing. This may enable higher efficiency utilization of available computational resources.

Environment 40 can be an underground environment (e.g., a mine or a tunnel) where line-of-sight satellite communication may not be available for mapping and positioning using GNSS technology. In some embodiments, central server 605 may be located within environment 40. In other embodiments, central server 605 may be remotely located.

The multiple agents of system 600 may simultaneously traverse environment 40 generating mapping data and inertial measurement data. Each agent 110 may traverse along different paths 640 and capture data for various portions 620 and 630 of environment 40. In some embodiments, each agent 110 may traverse along all three dimensions of a three-dimensional environment 40. In other embodiments, each agent 110 may only traverse along one or two dimensions of a three-dimensional environment 40. Environment 40 may be divided into one or more zones. In some embodiments, each agent 110 may be assigned to specific zone(s). This may improve mapping efficiency of environment 40 by limiting the overlapping area mapped by multiple agents.

In some embodiments, each of multiple agents 110 may include identical type, number and configuration of inertial and mapping sensors. In other embodiments, different agents 110 may include different type, number and/or configuration of inertial and/or mapping sensors.

Central server 605 can combine mapping and positioning data generated by each of the multiple agents 110 of system 600. Central server 605 can generate/update a global map based on the combined data from the multiple agents 110. The global map may be defined with respect to "absolute" Earth-centered coordinates (e.g., WGS84, latitude and longitude).

Central server 605 can use potential mapping correlations between overlapping regions scanned by two or more agents 110 for a given time period to improve mapping accuracy of the global map (compared with local maps at each agent 110) and positioning accuracy of the agents 110 within the global map.

As the multiple agents 110 traverse environment 40, different regions of environment 40 may be scanned at different instances in time. Central server 605 may retain mapping information of previously scanned regions as the global map is continuously updated based on combined data generated by multiple agents 110. A mapping confidence level may be associated with each previously scanned region. For example, a previously scanned region 660 that is not being currently scanned by any of the multiple agents 110 at the time instance illustrated in FIG. 6 may have a high mapping confidence level based on one or more recent previous scans. In some embodiments, central server 605 may update the mapping confidence level of a region based on the time duration after previous scan. System 600 may, for example, perform a larger reduction in the mapping confidence level of a region 670 having a larger time duration after previous scan.

Figure 7:
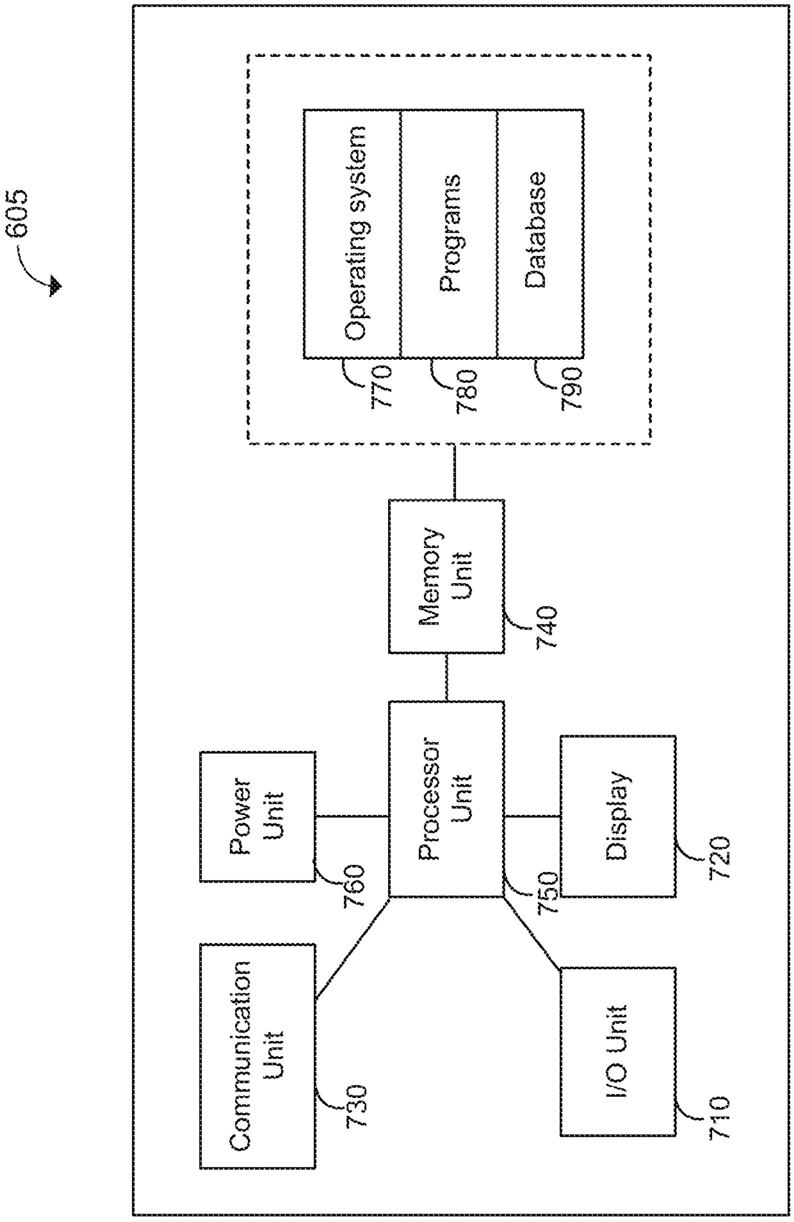
FIG. 7 is a block diagram showing components of an example central server of the system of FIG. 6.

Reference is now made to FIGS. 6 and 7. FIG. 7 is a block diagram showing components of central server 605. In the illustrated example, central server 605 includes an I/O unit 710, a display 720, a communication unit 730, a memory unit 740, a processor unit 750, and a power unit 760. In other examples, central server 605 may include fewer or greater number of components.

I/O unit 710 can include at least one of a mouse, a keyboard, a touch screen, a thumbwheel, a trackpad, a trackball, a card-reader, voice recognition software and the like, depending on the particular implementation of central server 605. In some embodiments, some of these components can be integrated with one another. I/O unit 710 can enable a user to interact with central server 605.

Display 720 may be a LED or LCD based display and may be a touch sensitive screen that supports gestures. Display 720 may be integrated into central server 605. Alternatively, display 720 may be located physically remote from central server 605 and communicate with central server 605 using a communication network. In some embodiments, central server 605 may not include a dedicated display 720.

Communication unit 730 may include any suitable design to provide bidirectional communication for central server 605 with other devices or computers (for example, with multiple agents 110). Communication unit 730 may include wired or wireless connection capabilities. Communication unit 730 may enable the bidirectional communication using any suitable communication network. The communication network may include, for example, the Internet, a Wide-Area Network (WAN), a Local-Area Network (LAN), a point-to-point connection, etc. The communication may be implemented using time-stamped communication messages. In some embodiments, communication unit 730 may enable low-latency communication for central server 605. Communication unit 730 can enable central server 605 to receive reduced mapping data and localized position data from multiple agents 110. Communication unit 730 can enable central server 605 to provide global map updates and global positioning updates to each of the multiple agents 110.

Power unit 760 may have any suitable design to provide power to other components of central server 605. For example, power unit 760 may include a battery pack.

Processor unit 750 may have any suitable design to perform operations of central server 605. Processor unit 750 can be any suitable processor, controller or digital signal processor that can provide sufficient processing power depending on the configuration, purposes and requirements of central server 605, as is known by those skilled in the art. For example, processor unit 750 may be a high-performance general processor. As another example, processor unit 750 may include a standard processor, such as an Intel® processor, or an AMD® processor. As another example, processor unit 750 can include more than one processor with each processor being configured to perform different dedicated tasks. As another example, specialized hardware (e.g., graphical processing units (GPUs)) can be used provide some of the functions provided by processor unit 750.

Processor unit 750 may control the operation of other components of central server 605. In some embodiments, processor unit 750 may combine received data from multiple agents to update a global map. Processor unit 750 may update global positioning data of each of the multiple agents based on the received localized position data and the updates to the global map.

In some embodiments, processor unit 750 may be at a remote location and communicate with central server 605 using a communication network. This may enable a more compact design for central server 605.

Memory unit 740 can include software code for implementing an operating system 770, programs 780 and a database 790. Memory unit 740 can include RAM, ROM, one or more hard drives, one or more flash drives or some other suitable data storage elements such as disk drives, etc. In some embodiments, memory unit 740 may be at a remote location and communicate with central server 605 using a communication network. This may enable a more compact design for central server 605. In some embodiments, memory unit 740 may be integrated into processor unit 750. This may enable faster memory read/write operations for processor unit 750.

Memory unit 740 can be used to store an operating system 770 and programs 780, as is commonly known by those skilled in the art. For instance, operating system 770 provides various basic operational processes for central server 605. For example, the operating system 770 may be an operating system such as Windows® Server operating system, or Red Hat® Enterprise Linux (RHEL) operating system, or another operating system. Programs 780 can include various programs so that central server 605 can perform various functions such as, but not limited to, receiving data from multiple agents, performing updates to global maps and global positioning of the multiple agents, providing global map updates and positioning updates to the multiple agents, etc.

Database 790 may include a Structured Query Language (SQL) database such as PostgreSQL or MySQL or a not only SQL (NoSQL) database such as MongoDB, or Graph Databases, etc. Database 790 may store reduced mapping data and localized position data received from multiple agents 110. In some embodiments, database 790 may store global map and global positioning data of multiple agents 110 for one or more time periods. Database 790 may store one or more maps of environment 40. For example, the map may be an initial global map received from an external device. As another example, database 790 may store multiple time-stamped global maps of environment 40. In some embodiments, database 790 may store one or more machine learning models used by central server 605. For example, central server 605 may use the machine learning models to perform mapping cross-correlations between multiple agents. In some embodiments, database 790 includes a map features repository that stores historical matched map features. The stored matched map features may be used to perform mapping cross-correlations between multiple agents.

Figure 8:
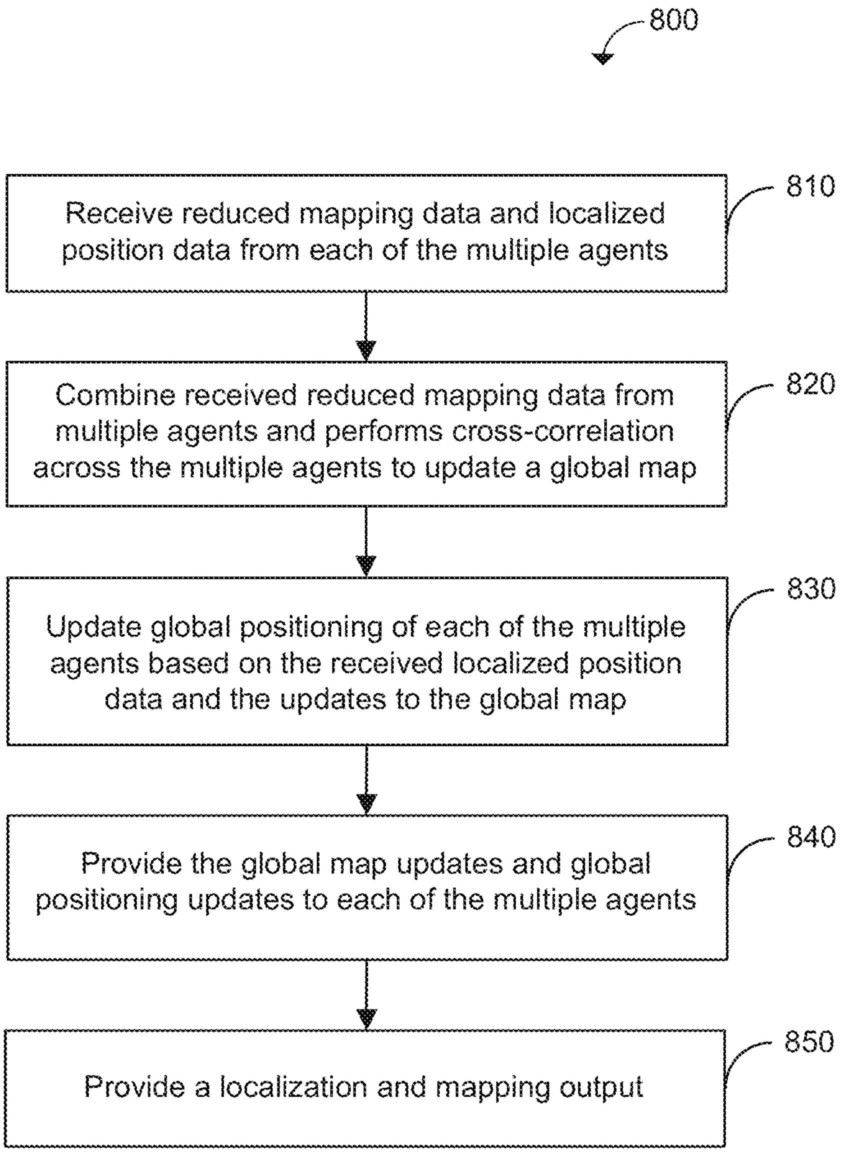
FIG. 8 is a flowchart showing another computer-implemented method of simultaneous localization and mapping, in accordance with one or more embodiments.

Reference is now made to FIG. 8. FIG. 8 is a flowchart showing a computer-implemented method 800 of simultaneous localization and mapping. Any suitable system may be used to implement method 800. For example, method 800 may be implemented using system 600 (FIG. 6) for simultaneous localization and mapping in environment 40 (FIG. 6) and concurrent reference is made now to FIGS. 6 and 7.

Method 800 may be performed at various times. For example, method 800 may be performed based on an automated schedule (e.g. a fixed time interval, a maximum period after previous mapping, etc.). As another example, method 800 may be continuously performed. As another example, method 800 may be automatically performed when a control input is provided (e.g., by a system user) to system 600.

At act 810, method 800 includes receiving reduced mapping data and localized position data from multiple agents. For example, central server 605 may receive reduced mapping data and localized position data from each of the multiple agents 110. Each multiple agent 110 may provide the reduced mapping data and localized position data by executing method 300 (FIG. 3).

At act 820, method 800 includes combining the received reduced mapping data from multiple agents and performing cross-correlation across the multiple agents to update a global map. For example, central server 605 may combine the reduced mapping data received at act 810 and perform cross-correlation across the multiple agents. Mapping correlations between overlapping regions (e.g., region 630) scanned by two or more agents 110 may enable the global map to have higher accuracy compared with local maps generated at each agent 110.

The global map may be a global map that was previously updated using method 800. In some embodiments, system 600 may receive an initial global map from an external device.

Central server 605 may use one or more machine learning models to perform cross-correlation across the multiple agents. The machine learning models may be trained to enable identification of matched map features. In some embodiments, central server 605 may use historical matched map features (e.g., stored in a map features repository in database 790) while performing cross-correlation across the multiple agents.

At act 830, method 800 includes updating global positioning of each of the multiple agents based on the updates to the global map and the received localized position data from the multiple agents. For example, central server 605 may update global positioning of each of the multiple agents 110 based on the localized position data received from the agent 110 and the global map updates from act 820. The combination of data from multiple agents and the higher accuracy of the global map can enable higher accuracy of the global positioning of agents 110 compared with the localized positioning determined at individual agents 110.

At act 840, method 800 includes providing the global map updates and global positioning updates to each of the multiple agents. For example, central server 605 may provide the global map updates and global positioning updates to each of the multiple agents 110. Each agent 110 may perform real-time updates to the local map and localized position of that agent 110 based on the data received from central server 605.

At act 850, method 800 includes providing a localization and mapping output. The localization and mapping output may be provided via a user interface. In some embodiments, the localization and mapping output may be provided via an output file or may be stored in a database (e.g., database 290).

The localization and mapping output may include the updated global map of environment 40 and/or updated global position information of the multiple agents 110 in near-real-time for user access and/or for higher-level data processing. In some embodiments, the localization and mapping output may include insights and/or recommendations (e.g., insights related to localization and mapping performance of the multiple agents 110, metadata related to early warning events, recommendations to improve global map accuracy including, for example, agent positioning to map a low mapping confidence region, etc.). One or more machine learning models may be used to generate the insights and/or recommendations.

The present invention has been described here by way of example only. Various modification and variations may be made to these exemplary embodiments without departing from the spirit and scope of the invention, which is limited only by the appended claims.

I claim:

1. A computer-implemented method of simultaneous localization and mapping in underground environments, the method comprising:

generating, by an agent, mapping data of the underground environment and inertial measurement data of the agent traversing the underground environment based on sensor data captured by one or more sensors of the agent;

generating, by the agent, reduced mapping data by performing data reduction of the generated mapping data, wherein the reduced mapping data is generated by inputting the mapping data into one or more machine learning models trained to project the mapping data to a lower dimensional latent space;

updating, by the agent, a local map based on correlated features in the reduced mapping data between a first data capture time and a second data capture time;

updating, by the agent, a localized position of the agent with reference to the updated local map based on the inertial measurement data and the reduced mapping data; and providing, by the agent via a user interface, a localization and mapping output including at least one of the updated local map and the updated localized position of the agent wherein the localization and mapping output further includes an insight or recommendation for improving the simultaneous localization and mapping by positioning the agent to map a low confidence region, the low confidence region being determined based on a time duration since a previous scan of that region.

2. The method of claim 1, wherein the mapping data includes any combination of range data, bearing data and elevation data of the underground environment with reference to the agent.

3. The method of claim 1, wherein the mapping data includes at least one of i) image data generated by one or more cameras and ii) point cloud data generated by one or more Light Detection and Ranging (LiDAR) sensors.

4. The method of claim 1, wherein the inertial measurement data includes linear acceleration and angular velocity of the agent along three mutually perpendicular axes.

5. The method of claim 1, wherein the one or more machine learning models are trained using training data customized for underground mining environments.

6. A system for simultaneous localization and mapping in underground environments, the system comprising an agent configured to traverse the underground environment, the agent having:

an inertial sensor configured to generate inertial measurement data of the agent;

a mapping sensor configured to generate mapping data of the underground environment;

a memory storing processor-executable instructions; and a processor communicatively coupled to the memory, the instructions configuring the processor to:

receive the inertial measurement data and the mapping data;

generate reduced mapping data by performing data reduction of the received mapping data, wherein the reduced mapping data is generated by inputting the mapping data into one or more machine learning models trained to project the mapping data to a lower dimensional latent space;

update a local map based on correlated features in the reduced mapping data between a first data capture time and a second data capture time;

update a localized position of the agent with reference to the updated local map based on the inertial measurement data and the reduced mapping data; and provide, via a user interface, a localization and mapping output including at least one of the updated local map and the updated localized position of the agent, wherein the localization and mapping output further includes an insight or recommendation for improving the simultaneous localization and mapping by positioning the agent to map a low confidence region, the low confidence region being determined based on a time duration since a previous scan of that region.

7. The system of claim 6, wherein at least one of the inertial sensor and the mapping sensor includes multiple sensors collocated on a single substrate.

8. The system of claim 6, wherein the processor is collocated on a same substrate as at least one of the inertial sensor and the mapping sensor.

9. The system of claim 6, wherein the mapping sensor includes one or more cameras, and the mapping data includes image data generated by the one or more cameras.

10. The system of claim 6, wherein the mapping sensor includes one or more Light Detection and Ranging (LiDAR) sensors and the mapping data includes point cloud data generated by the one or more LiDAR sensors.

11. The system of claim 6, wherein the inertial measurement data includes linear acceleration and angular velocity of the agent along three mutually perpendicular axes.

12. The system of claim 6, wherein the one or more machine learning models are trained using training data customized for underground mining environments.

13. A computer-implemented method of simultaneous localization and mapping in underground environments, the method comprising:

receiving, by a central server, reduced mapping data and localized position data from each of multiple agents traversing the underground environment, the reduced mapping data being generated at each of the multiple agents by inputting captured mapping data into one or more machine learning models trained to project the captured mapping data to a lower dimensional latent space;

updating, by the central server, a global map by combining the reduced mapping data from the multiple agents and performing cross-correlation across the multiple agents between overlapping regions scanned by two or more of the multiple agents;

updating, by the central server, global positioning of each of the multiple agents based on the received localized position data and the updated global map;

providing, by the central server, the updated global map and the updated global positioning to each of the multiple agents; and providing, by the central server via a user interface, a localization and mapping output including at least one of the updated global map and the updated global positioning of one or more of the multiple agents, wherein the localization and mapping output further includes an insight or recommendation for improving the simultaneous localization and mapping by positioning at least one of the multiple agents to map a low confidence region, the low confidence region being determined based on a time duration since a previous scan of that region.

14. The method of claim 13, wherein the central server is implemented by dynamically assigning central server functionalities dynamically between the multiple agents.

* * * * *